(12) United States Patent
Ishiyama et al.

(10) Patent No.: US 10,286,777 B2
(45) Date of Patent: May 14, 2019

(54) FUEL TANK APPARATUS

(71) Applicant: Kawasaki Jukogyo Kabushiki Kaisha, Kobe-shi, Hyogo (JP)

(72) Inventors: Keisuke Ishiyama, Kobe (JP); Takashi Uchida, Kakogawa (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 131 days.

(21) Appl. No.: 15/462,213

(22) Filed: Mar. 17, 2017

(65) Prior Publication Data

US 2017/0298879 A1    Oct. 19, 2017

(30) Foreign Application Priority Data

Apr. 13, 2016 (JP) ................. 2016-080166

(51) Int. Cl.
| | |
|---|---|
| *B60K 15/03* | (2006.01) |
| *B60K 15/063* | (2006.01) |
| *B60R 13/08* | (2006.01) |
| *F02M 37/00* | (2006.01) |
| *B60K 15/073* | (2006.01) |

(52) U.S. Cl.
CPC ............ *B60K 15/03* (2013.01); *B60K 15/063* (2013.01); *B60K 15/073* (2013.01); *B60R 13/0838* (2013.01); *F02M 37/007* (2013.01); *F02M 37/0076* (2013.01); *B60K 2015/03243* (2013.01); *B60K 2015/03421* (2013.01); *B60Y 2200/12* (2013.01); *B60Y 2410/114* (2013.01)

(58) Field of Classification Search
CPC .. F02M 37/0076; F02M 37/007; B60K 15/03; B60K 15/063; B60K 15/073; B60K 2015/03243; B60K 2015/03421; B60Y 2410/114; B60Y 2200/12; B60R 13/0838
See application file for complete search history.

(56) References Cited

U.S. PATENT DOCUMENTS

| | | | | |
|---|---|---|---|---|
| 8,292,115 | B2 * | 10/2012 | Kobayashi | B60K 15/03177 220/319 |
| 8,839,896 | B2 * | 9/2014 | Oshima | B62J 37/00 180/219 |
| 2009/0242300 | A1 * | 10/2009 | Mizukura | B62J 35/00 180/69.4 |
| 2018/0335004 | A1 * | 11/2018 | Szabo | B62J 37/00 |

FOREIGN PATENT DOCUMENTS

JP    2002-211466    7/2002

\* cited by examiner

*Primary Examiner* — Hung Q Nguyen
*Assistant Examiner* — Mark L. Greene

(57) ABSTRACT

A fuel tank apparatus is disposed above an engine. The fuel tank apparatus includes a fuel tank in which fuel is stored and a fuel pump coupled to the bottom of the fuel tank. A heat-shield cover that covers a portion of the fuel pump, which portion is exposed from the fuel tank, to shield the portion from heat of the engine is mounted on a coupling portion between the fuel pump and the fuel tank.

5 Claims, 5 Drawing Sheets

FUEL TANK APPARATUS

CROSS REFERENCE TO THE RELATED APPLICATION

This application is based on and claims Convention priority to Japanese patent application No. 2016-080166, filed Apr. 13, 2016, the entire disclosure of which is herein incorporated by reference as a part of this application.

BACKGROUND OF THE INVENTION (Field of the Invention)
The present invention relates to a fuel tank apparatus or fuel tank assembly which is disposed in the vicinity of an engine of a saddle-riding vehicle such as a motorcycle.

(Description of Related Art)
A saddle-riding vehicle such as a motorcycle has been known in which, in order to protect a fuel pump for a fuel tank from heat of an engine, a heat-shield plate is provided between the engine and the fuel pump (for example, JP Laid-open Patent Publication No. 2002-211466). In JP Laid-open Patent Publication No. 2002-211466, a vehicle body cover is bent to form a heat-shield plate between an engine and a fuel pump.

With a structure in which a partition wall is provided between an engine and a fuel pump, such as that disclosed in JP Laid-open Patent Publication No. 2002-211466, or with a structure in which a heat-shield cover is mounted on an engine, the heat-shield cover is large in size, and in addition, a target to be protected cannot be entirely covered, which may result in a failure to produce a sufficient heat-shielding effect.

SUMMARY OF THE INVENTION

An object of the present invention is to provide a fuel tank apparatus capable of suppressing an increase in the temperature of a fuel pump by effectively protecting the fuel pump from heat of an engine.

In order to achieve the above-described object, a fuel tank apparatus according to a first aspect of the present invention is a fuel tank apparatus which is disposed above an engine and includes: a fuel tank; and a fuel pump coupled to a bottom of the fuel tank, wherein a heat-shield cover that covers a portion of the fuel pump that is exposed from the fuel tank to shield the portion from heat of the engine is mounted on a coupling portion between the fuel pump and the fuel tank.

As a result of diligent research, the inventor has found that a heat shield can be more effective when a heat-shield cover is mounted on a fuel pump or a fuel tank, than when a heat-shield cover is mounted on an engine which is a heat-generating component, since the heat-shield cover mounted on the fuel pump or the fuel tank can prevent heat of the engine from transferring directly to the heat-shield cover due to heat transfer. According to the above-described configuration, the heat-shield cover is mounted on the coupling portion between the fuel pump and the fuel tank. This allows the heat-shield cover to be downsized since the target to be covered is small, and also allows the fuel pump, which is to be protected, to be reliably covered, resulting in a high heat-shielding effect. Therefore, an increase in the temperature of the fuel pump can be suppressed. Furthermore, since the heat-shield cover is not provided on the engine, it is possible to prevent a component around the engine and the heat-shield cover from interfering with each other.

In the first aspect of the present invention, the fuel pump may include a pump main body and a pump flange that is provided on a lower portion of the pump main body and coupled to the bottom of the fuel tank, in which case the coupling portion may include the pump flange, and the heat-shield cover may cover at least a lower surface of the pump flange. According to this configuration, the heat-shield cover effectively shields the portion exposed from the fuel tank from heat. Specifically, in order to prevent heat generated by the engine from reaching the fuel pump, the engine may be covered by the heat-shield cover, but covering the pump flange of the fuel pump rather than the engine makes the structure simple since the area covered by the heat-shield cover is small.

In the case where the heat-shield cover covers the lower surface of the pump flange, the heat-shield cover may be formed by bending a sheet-like member and may include: a cover portion that covers the lower surface of the pump flange; and a mounting portion that is bent to continue from the cover portion so as to be mounted on the pump flange. According to this configuration, the mounting portion, which is required to mount the heat-shield cover, and the cover portion, which shields the fuel pump from heat, are integrally formed, and therefore, the total number of components can be reduced. Furthermore, the use of a sheet-like member that can be bent makes it possible to mount the heat-shield cover through a simple operation in which the heat-shield cover mounted at the mounting portion is bent such that the cover portion covers the pump flange.

In the case where the heat-shield cover includes the cover portion and the mounting portion, the cover portion may have therein a through-hole through which a fuel supply pipe extending from the pump main body penetrates, and a wire for the fuel pump may be led from a gap between the cover portion and the mounting portion. According to this configuration, the cover portion and the fuel supply pipe are prevented from interfering with each other. In addition, since the wire for the fuel pump is led from the gap between the cover portion and the mounting portion, the operation of installing the wire is rendered to be easy.

In the first aspect of the present invention, an engagement groove may be formed at an end portion of the mounting portion that is on an opposite side from the cover portion, and an engagement piece that is engaged with the engagement groove may be formed at an end portion of the cover portion that is on an opposite side from the mounting portion. According to this configuration, only engaging the engagement piece with the engagement groove allows the cover portion to be supported by the mounting portion, and thus the heat-shield cover is easily mounted. Furthermore, since it is not necessary to additionally prepare a member for supporting the cover portion, the structure is simple.

In the case where the engagement groove and the engagement piece are provided, the engagement piece may include: an engagement piece main body having a shape of a strip extending in an engagement direction; and a retaining portion projecting from the engagement piece main body in a widthwise direction of the strip, in which case the engagement groove may include: a short groove through which the engagement piece main body passes along the engagement direction; and a long groove with which the retaining portion is engaged. According to this configuration, the engagement piece is reliably retained with a simple structure.

In the case where the heat-shield cover includes the cover portion and the mounting portion, the fuel tank apparatus may be disposed between a head pipe and a rider seat of a motorcycle, and a bending portion of the heat-shield cover that is between the cover portion and the mounting portion may be positioned at a front end of the heat-shield cover. According to this configuration, incoming wind can smoothly flow rearward together with hot air from the engine while the bending portion reduces air resistance. Accordingly, an increase in the temperature of the fuel pump can be further suppressed.

A fuel tank apparatus according to a second aspect of the present invention is disposed above an engine and includes: a fuel tank; and a fuel pump coupled to a bottom of the fuel tank; and a heat-shield cover mounted on the fuel pump or the fuel tank, the heat-shield cover covering a portion of the fuel pump, which portion is exposed from the fuel tank, to shield the portion from heat of the engine.

According to this configuration, the heat-shield cover is mounted on the fuel pump or the fuel tank. This allows the heat-shield cover to be downsized, and also allows the fuel pump, which is to be protected, to be reliably covered, resulting in a high heat-shielding effect. Therefore, an increase in temperature of the fuel pump can be suppressed. Furthermore, since the heat-shield cover is not provided on the engine, it is possible to prevent a component around the engine and the heat-shield cover from interfering with each other.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
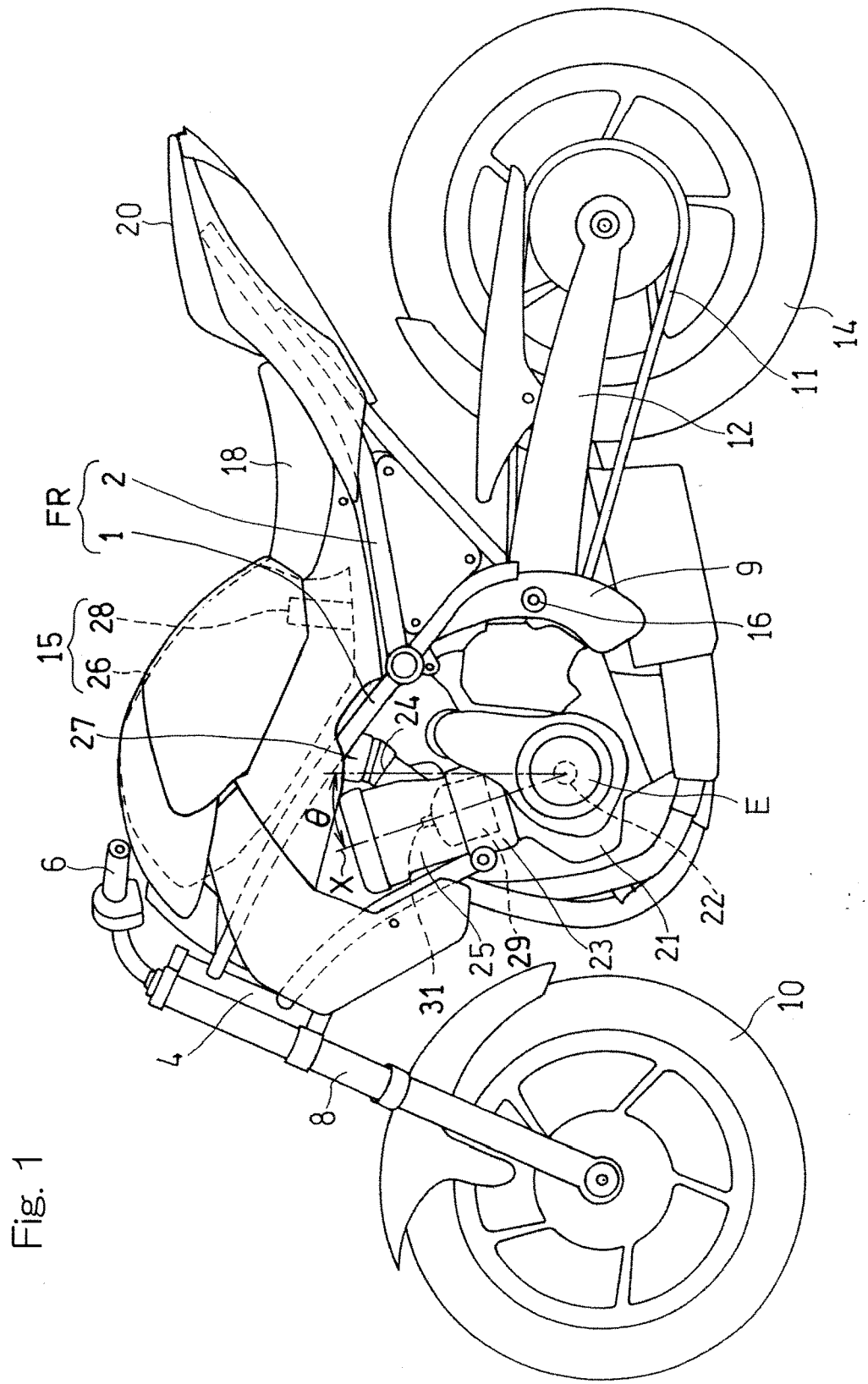
FIG. 1 is a side view showing a motorcycle including a fuel tank apparatus according to a first preferred embodiment of the present invention.

Hereinafter, a preferred embodiment of the present invention will be described with reference to the drawings. FIG. 1 is a side view showing a motorcycle including a fuel tank apparatus according to a first preferred embodiment of the present invention. A motorcycle frame structure FR for the motorcycle includes a main frame 1 that forms a front half thereof, and a rear frame 2 that forms a rear half thereof. The main frame 1 extends rearward and obliquely downward from a head pipe 4 provided at a front end of the main frame 1. The rear frame 2 extends rearward from a rear portion of the main frame 1.

A front fork 8 is rotatably supported by the head pipe 4 through a steering shaft (not shown). A steering handle 6 is fixed to an upper end portion of the front fork 8, and a front wheel 10 is fitted to a lower end portion of the front fork 8.

A swingarm bracket 9 is provided at a rear end portion of the main frame 1. A swingarm 12 is supported by the swingarm bracket 9 for swing movement in an up-down direction or vertical direction about a pivot shaft 16 that is mounted to the swingarm bracket 9. A rear wheel 14 is rotatably supported by a rear end portion of the swingarm 12. An engine E is mounted to a lower portion of the main frame 1 at the front side of the swingarm bracket 9. The engine E drives the rear wheel 14 through a power transmission member 11 such as a chain.

The engine E includes a crank case 21 that supports a crankshaft 22, a cylinder 23 connected to an upper portion of the crank case 21, and a cylinder head 25 above the cylinder 23. The cylinder 23 and the cylinder head 25 form main heat-generating portions of the engine E. Specifically, a throttle body 27 is connected to an intake port 24 in a rear portion of the cylinder head 25, and a fuel injector (not shown) is embedded in the throttle body 27. A combustion chamber 29, in which fuel and air are introduced and burned, is formed inside the cylinder 23 and the cylinder head 25. A spark plug 31 is provided on the cylinder head 25, and a tip end of the spark plug 31 faces the combustion chamber 29. The fuel injector injects fuel into air to form a fuel-air mixture. This fuel-air mixture is introduced into the combustion chamber 29 and ignited by the spark plug 31, thus being burned. The crankshaft 22 is rotated by this combustion via a connecting rod (not shown), thereby driving the rear wheel 14. Thus, the cylinder 23 and the cylinder head 25 serve as main heat-generating portions of the engine E.

The engine E is installed in a forward-tilted attitude, and a tilt angle θ of an axis X of the cylinder 23 and the cylinder head 25 relative to the vertical direction is approximately 5 to 45 degrees. A fuel tank apparatus 15 is disposed on an upper portion of the main frame 1 and above the cylinder head 25 of the engine E. A rider seat 18 and a passenger seat 20 are supported by the rear frame 2. The fuel tank apparatus 15 is disposed between the head pipe 4 and the rider seat 18.

The fuel tank apparatus 15 is supported by the motorcycle frame structure FR by a known method, and includes a fuel tank 26, in which fuel is stored, and a fuel pump 28 mounted at a bottom of the fuel tank 26. The fuel tank 26 includes: an upper plate 26a that is curved upward to bulge outward and opens downward; and a lower plate (a bottom plate) 26b that closes the opening of the upper plate 26a. The upper plate 26a and the lower plate 26b are welded together along the peripheral edge of the lower plate 26b, and the lower plate 26b forms the bottom of the fuel tank 26. The fuel pump 28 supplies the fuel stored in the fuel tank 26 to the engine E, and a major portion of the fuel pump 28 is accommodated inside the fuel tank 26. The fuel pump 28 is located rearward of the cylinder head 25 of the engine E.

Figure 2:
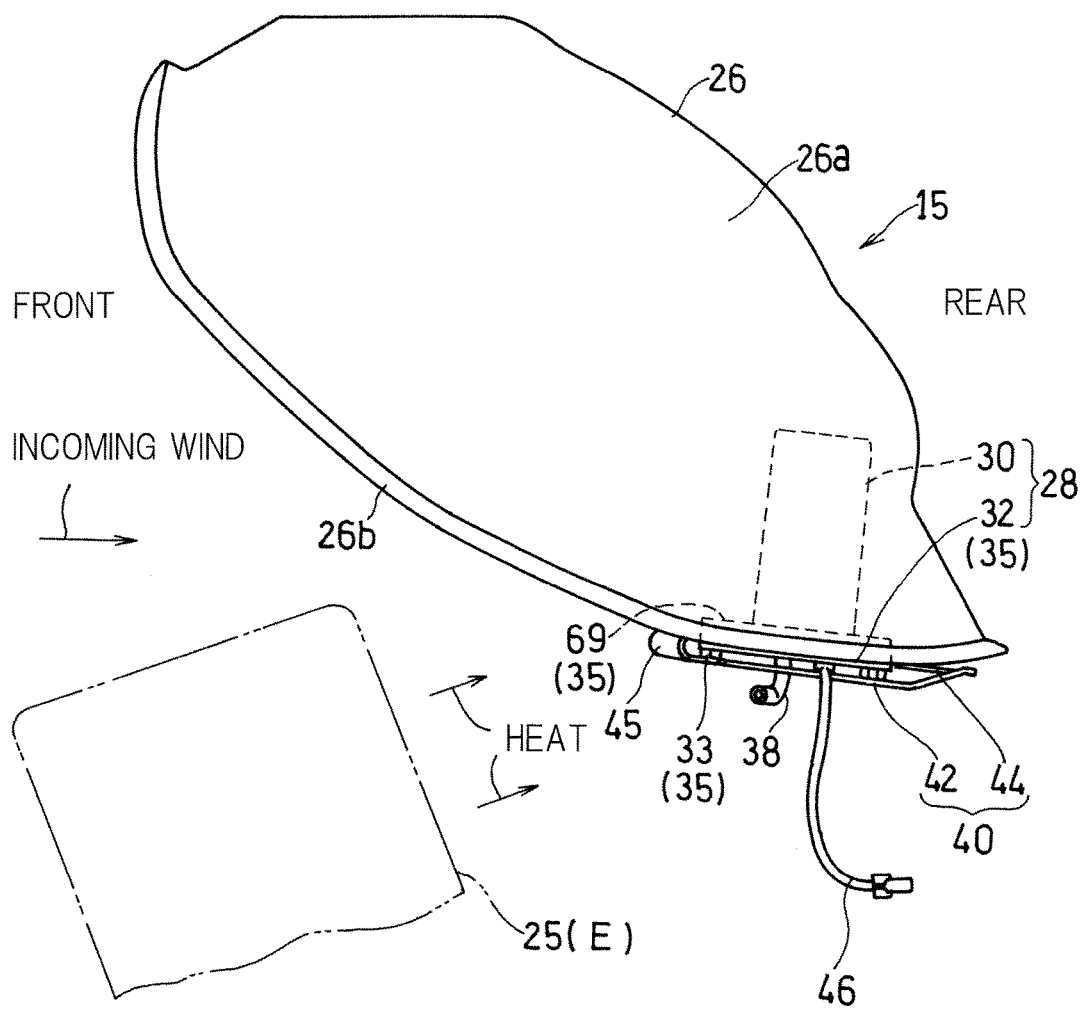
FIG. 2 is a side view showing the fuel tank apparatus.

As shown in FIG. 2, the fuel pump 28 includes a pump main body 30 accommodated inside the fuel tank 26 and an annular pump flange 32 provided on a lower portion of the pump main body 30. The pump flange 32 has a plurality of bolt insertion holes 32a (FIG. 4) formed therein and is coupled to the bottom plate 26b of the fuel tank 26 with bolts 33. In the present embodiment, five bolt insertion holes 32a are provided at equal intervals in the circumferential direction of the pump flange 32. A coupling structure of the fuel tank 26 and the fuel pump 28 will be described later. The pump flange 32 and the bolts 33 cooperate together to form a coupling portion 35 between the fuel pump 28 and the fuel tank 26.

The fuel pump 28 further includes a fuel supply pipe 38 extending downward from the pump main body 30. A fuel tube (not shown) is connected to the fuel supply pipe 38, and the fuel is supplied to the engine E therethrough. In the present embodiment, the pump flange 32 constitutes an exposed portion of the fuel pump 28, that is exposed from the fuel tank 26.

A heat-shield cover 40 that shields the fuel pump 28 from heat of the engine E is mounted on the coupling portion 35 between the fuel pump 28 and the fuel tank 26. The heat-shield cover 40 covers the exposed portion of the fuel pump 28 that is exposed from the fuel tank 26. In the present embodiment, the heat-shield cover 40 covers a lower surface of the pump flange 32 from below and also covers the front of the pump flange 32.

The heat-shield cover 40 is formed by bending a sheet-like member, and includes a cover portion 42 that covers the lower surface of the pump flange 32 and a mounting portion 44 at which the heat-shield cover 40 is mounted on the coupling portion 35. The mounting portion 44 is bent rearward at a bending portion 45 and is connected to the cover portion 42. In other words, the bending portion 45 of the heat-shield cover 40 that is between the cover portion 42 and the mounting portion 44 is located at a front end of the heat-shield cover 40 and forward of the pump flange 32 in the state where the heat-shield cover 40 is mounted on the coupling portion 35. A wire 46 for the fuel pump 28 is led from a gap between the cover portion 42 and the mounting portion 44. The wire 46 includes a control line and a power line for the fuel pump 28, and is connected to, for example, an electronic control unit (not shown).

Figure 3:
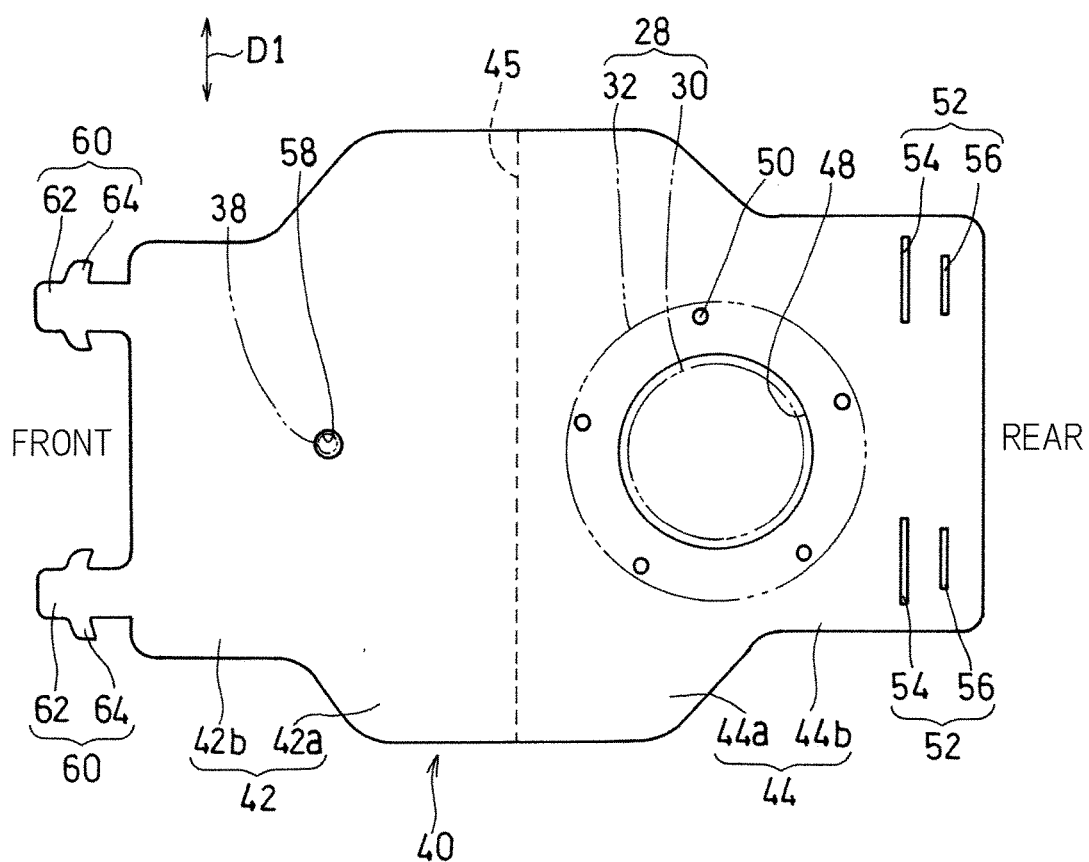
FIG. 3 is a plan view showing a heat-shield cover of the fuel tank apparatus.

The heat-shield cover 40 is made of a heat-insulating material and is preferably an elastic member that can be easily bent. In the present embodiment, the heat-shield cover 40 is formed from a rubber sheet. FIG. 3 is a plan view showing the state where the heat-shield cover 40 is detached, that is, the state prior to when the heat-shield cover 40 is bent. As shown in FIG. 3, the heat-shield cover 40 includes the cover portion 42 on the front side of the bending portion 45 and the mounting portion 44 on the rear side of the bending portion 45.

The cover portion 42 includes a wide portion 42a that is connected to the mounting portion 44 and a narrow portion 42b that is on the opposite side (the front side) from the mounting portion 44, which narrow portion 42b is reduced in size in a vehicle widthwise direction D1 than the wide portion 42a. Likewise, the mounting portion 44 includes a wide portion 44a that is connected to the cover portion 42 and a narrow portion 44b that is on the opposite side (the rear side) from the cover portion 42, which narrow portion 44b is reduced in size in the vehicle widthwise direction D1 than the wide portion 44a. The wide portion 42a of the cover portion 42 and the wide portion 44a of the mounting portion 44 have the same size in the vehicle widthwise direction D1, and the narrow portion 42b of the cover portion 42 and the narrow portion 44b of the mounting portion 44 have the same size in the vehicle widthwise direction D1.

Figure 4:
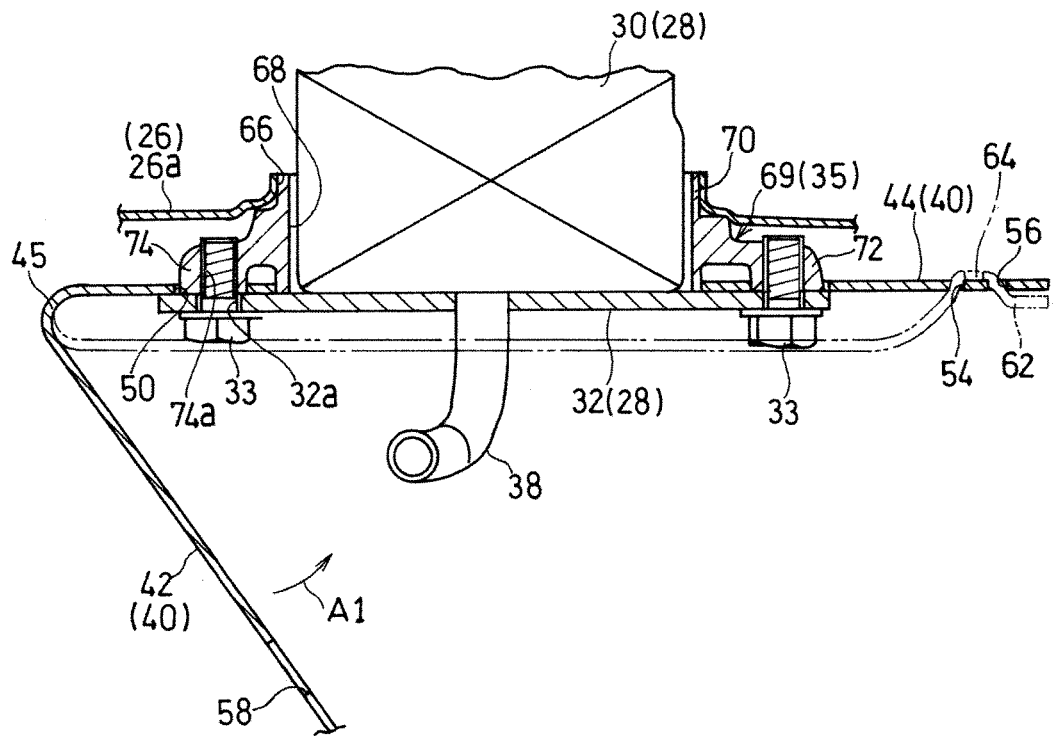
FIG. 4 is a longitudinal cross-sectional view showing a state where the heat-shield cover is being mounted.

The mounting portion 44 of the heat-shield cover 40 has a circular pump insertion hole 48 formed therein, through which the pump main body 30 is inserted. The mounting portion 44 also has a plurality of first through-holes 50 formed outside the pump insertion hole 48. In the present embodiment, five first through-holes 50 are provided at equal intervals in the circumferential direction of the first through-hole 50. In other words, the first through-holes 50 are provided at positions corresponding to the bolt insertion holes 32a of the pump flange 32 (FIG. 4).

At a rear end portion of the narrow portion 44b of the mounting portion 44, two pairs of engagement grooves 52, 52 are formed so as to be aligned in the vehicle widthwise direction D1. Specifically, each of the engagement grooves 52 extends in the vehicle widthwise direction D1 and includes a first groove 54 that is long in length and a second groove 56 that is short in length. The first groove 54 and the second groove 56 are aligned in the front-rear direction or longitudinal direction of the motorcycle such that the first groove 54 is positioned frontward of the second groove 56.

The cover portion 42 of the heat-shield cover 40 has a second through-hole 58 formed therein, through which the fuel supply pipe 38 of the fuel pump 28 penetrates. At a front end portion of the narrow portion 42b of the cover portion 42, engagement pieces 60, 60 that are engaged with the engagement grooves 52, 52 are formed so as to be aligned in the vehicle widthwise direction D1. Each of the engagement pieces 60 is composed of a projection extending frontward from a front end of the narrow portion 42b, and includes an engagement piece main body 62 having the shape of a strip extending in the front-rear direction and a retaining portion 64 projecting from the engagement piece main body 62 in the widthwise direction of the strip (the vehicle widthwise direction D1).

The dimension of the engagement piece main body 62 in the vehicle widthwise direction D1, or the width is less than the length of the second groove 56, which is short in length. The dimension of the retaining portion 64 in the vehicle widthwise direction D1 is set to be slightly greater than the length of the first groove 54, which is long in length. Although two pairs of the engagement grooves 52 and the engagement pieces 60 are provided in the present embodiment, one pair of the engagement groove 52 and the engagement piece 60 may be provided, or three or more pairs of the engagement grooves 52 and the engagement pieces 60 may be provided.

A mounting structure of the fuel pump 28 and the heat-shield cover 40 to the fuel tank 26 will be described with reference to FIG. 4 and FIG. 5. As shown in FIG. 4, the bottom plate 26b of the fuel tank 26 has an opening 66 formed therein. A ring member 69 is inserted into the opening 66 and fixedly attached to the bottom plate 26b by means of welding. Specifically, the ring member 69 includes a cylindrical body 70 having a hollow hole 68 therein and a ring flange portion 72 extending outward from an outer peripheral surface of the cylindrical body 70. An upper end portion of the cylindrical body 70 is welded to the bottom plate 26b.

The ring flange portion 72 includes a plurality of boss portions 74. Five boss portions 74 are formed at equal intervals in the circumferential direction of the ring flange portion 72 and each have a circular column shape having a threaded hole 74a therein. The fuel pump 28 is mounted to the fuel tank 26 via the ring member 69. In other words, the ring member 69 and the pump flange 32 of the fuel pump 28 cooperate together to form the coupling portion 35 between the fuel pump 28 and the fuel tank 26.

Specifically, the pump main body 30 of the fuel pump 28 is inserted into the hollow hole 68 of the ring member 69 from below. A lower end portion of the cylindrical body 70 of the ring member 69 is inserted through the pump insertion hole 48 of the mounting portion 44 of the heat-shield cover 40, and the boss portions 74 of the ring flange portion 72 are inserted through the first through-holes 50 of the mounting portion 44 of the heat-shield cover 40, respectively. In this state, the bolts 33 are inserted through the bolt insertion holes 32a of the pump flange 32 from below and is fastened to the threaded holes 74a of the boss portions 74, respectively. Thus, the mounting portion 44 of the heat-shield cover 40 and the fuel pump 28 are mounted to the fuel tank 26.

Subsequently, the cover portion 42 is bent rearward (in the direction of an arrow A1) at the bending portion 45 of the heat-shield cover 40 to cover the lower surface of the pump flange 32 from below, as shown in FIG. 2. At this time, the fuel supply pipe 38 of the fuel pump 28 is caused to penetrate through the second through-hole 58 of the cover portion 42 shown in FIG. 4.

Figure 5:
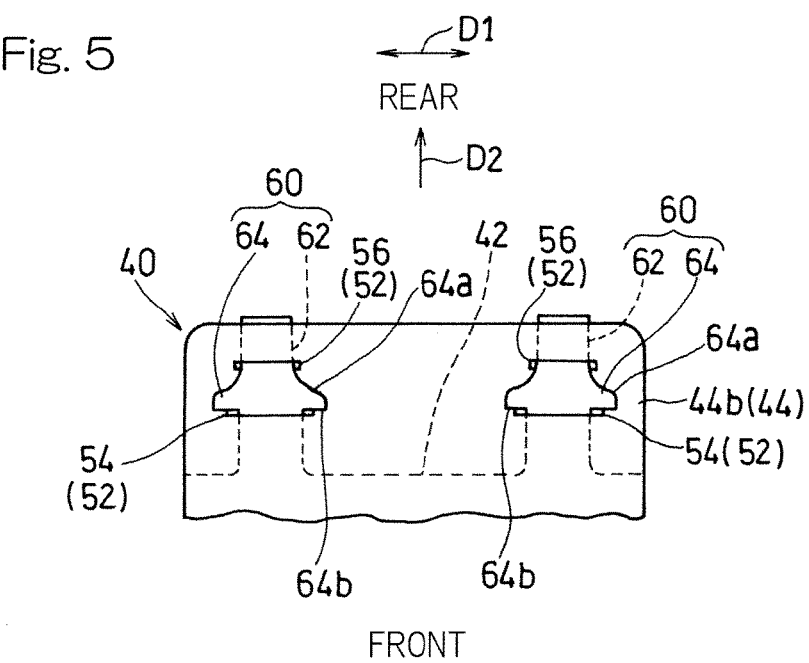
FIG. 5 is a plan view showing a state where an engagement piece and an engagement groove of the heat-shield cover are engaged with each other.

Furthermore, as shown in FIG. 5, each engagement piece main body 62 of the cover portion 42 is caused to pass through the first groove 54, which is long in length, and the second groove 56, which is short in length, in order along an engagement direction D2 (the front-rear direction) to bring the retaining portion 64 into engagement with the first groove 54, which is long in length. Although the dimension of the retaining portion 64 in the vehicle widthwise direction D1 is slightly greater than the length of the first groove 54 in the vehicle widthwise direction D1, since the heat-shield cover 40 is formed from a rubber sheet, the retaining portion 64 can be caused to forcibly pass through the first groove 54 by compressing the retaining portion 64. After completion of the passing of the retaining portion 64, when the compressed state is released, the retaining portion 64 cannot pass back through the first groove 54, resulting in the engagement piece 60 being retained. Accordingly, the cover portion 42 of the heat-shield cover 40 is engaged with the mounting portion 44. The retaining portion 64 includes: an inclined portion 64a that is gradually reduced in width towards a rearward and passes through the first groove 54; and a step portion 64b formed on the front side of the inclined portion 64a. The step portion 64b is engaged with the first groove 54, and therefore, the retaining portion 64 is retained.

Figure 6:
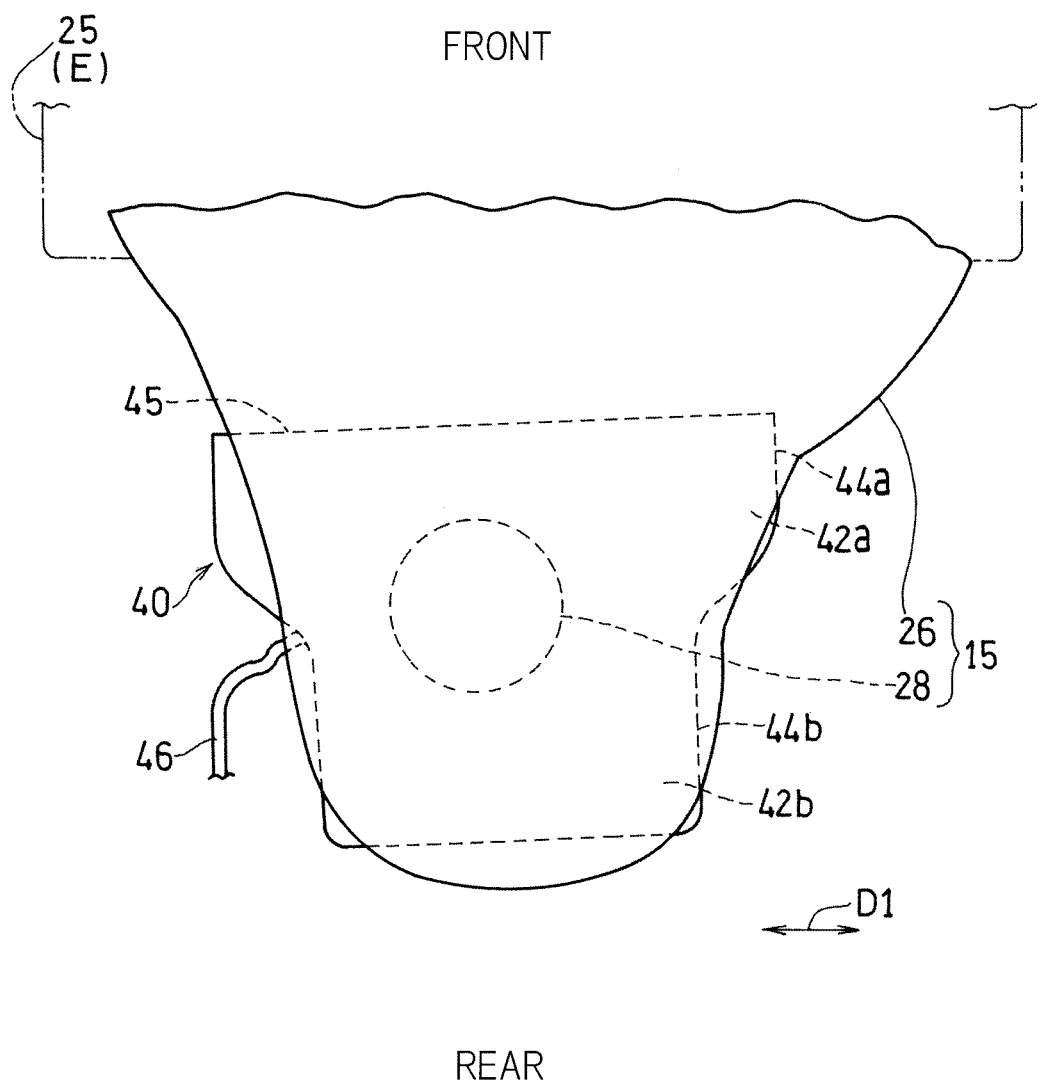
FIG. 6 is a plan view showing a rear portion of the fuel tank apparatus.

As shown in FIG. 6, in the state where the heat-shield cover 40 is mounted, the wide portion 42a of the cover portion 42 and the wide portion 44a of the mounting portion 44 overlap each other in a plan view, and the narrow portion 42b of the cover portion 42 and the narrow portion 44b of the mounting portion 44 overlap each other in the plan view. In other words, a portion of the heat-shield cover 40, that is wide in the vehicle widthwise direction D1, is positioned on a front portion of the heat-shield cover 40, and another portion of the heat-shield cover 40, that is narrow in the vehicle widthwise direction D1, is positioned on a rear portion of the heat-shield cover 40. Since the cylinder head 25 of the engine E, which forms a heat-generating component, is positioned frontward of the fuel pump 28, it is possible to provide an effective shield from heat of the engine E by making the front portion of the heat-shield cover 40 wide. The wire 46 for the fuel pump 28 is extended from the narrow portion positioned rearward. Accordingly, the wire 46 can be easily handled.

In a motorcycle shown in FIG. 1, the fuel tank apparatus 15 is generally disposed above the engine E. The fuel pump 28 supplies the fuel, stored in the fuel tank 26, to the engine E, and therefore, when the fuel pump 28 is disposed at a lower portion of the fuel tank 26, the fuel pump 28 is likely to be close to the engine E disposed below the fuel tank apparatus 15. When the fuel pump 28 is disposed close to the engine E, a pipe between the fuel pump 28 and the engine E can be made short. On the other hand, since the air heated by the engine E is likely to rise, such high-temperature air is likely to hit the fuel pump 28. Therefore, there are instances where the fuel pump 28 needs to be protected from heat of the engine E.

As a result of diligent research, the inventor has found that a heat shield can be more effective when the heat-shield cover 40 is mounted on the fuel tank apparatus 15 side as shown in FIG. 2, than when the heat-shield cover is mounted on the engine E, since the heat-shield cover 40 mounted on the fuel tank apparatus 15 side can prevent heat of the engine from transferring directly to the heat-shield cover due to heat transfer.

According to the above-described configuration, the heat-shield cover 40 is mounted on the coupling portion 35 between the fuel pump 28 and the fuel tank 26. This allows the heat-shield cover 40 to be downsized since the target to be covered is small. Moreover, this allows the fuel pump 28, which is to be protected, to be reliably covered, resulting in a high heat-shielding effect. Therefore, an increase in the temperature of the fuel pump 28 can be suppressed. Furthermore, since the heat-shield cover is not provided on the engine E, it is possible to prevent a component around the engine E and the heat-shield cover 40 from interfering with each other.

In particular, the heat-shield cover 40 is provided so as to cover at least the lower surface of the pump flange 32, thereby to allowing a portion exposed from the fuel tank 26 to be effectively shielded from heat. This makes the structure simple since the area of the pump flange 32 covered by the heat-shield cover 40 is small, compared with the case where the engine E is covered by the heat-shield cover.

Furthermore, the heat-shield cover 40 is formed by bending a sheet-like member, and includes the cover portion 42 that covers the lower surface of the pump flange 32 and the mounting portion 44 that is bent to continue from and connected to the cover portion 42 so as to be mounted on the pump flange 32. As described above, the mounting portion 44, which is required to mount the heat-shield cover 40, and the cover portion 42, which shields the fuel pump 28 from heat, are integrally formed, and therefore, the total number of components can be reduced. Furthermore, with the use of a sheet-like member that can be easily bent, the heat-shield cover 40 is mounted at the mounting portion 44 and then, is bent at the bending portion 45 to cover the pump flange 32 by the cover portion 42. Therefore, the operation of mounting the heat-shield cover 40 is easy.

Since the fuel supply pipe 38 of the fuel pump 28 penetrates through the second through-hole 58 formed in the cover portion 42, the cover portion 42 and the fuel supply pipe 38 can be prevented from interfering with each other. In addition, since the wire 46 for the fuel pump 28 is led from the gap between the cover portion 42 and the mounting portion 44, the operation of installing the wire 46 is rendered to be easy.

The heat-shield cover 40 shown in FIG. 3 has the engagement grooves 52 formed in the mounting portion 44 and includes, at the cover portion 42, the engagement pieces 60 that are engaged with the engagement grooves 52. Accordingly, only engaging the engagement pieces 60 with the engagement grooves 52 allows the cover portion 42 to be supported by the mounting portion 44, and thus the heat-shield cover 40 is easily mounted. Furthermore, since it is not necessary to additionally prepare a member for supporting the cover portion 42, the structure is simple.

Furthermore, each engagement piece 60 includes the engagement piece main body 62 having the shape of a strip extending in the engagement direction D2 (FIG. 5) and the retaining portion 64 projecting from the engagement piece main body 62 in the widthwise direction D1 of the strip. Each of the engagement grooves 52 includes the short second groove 56 through which the engagement piece main body 62 passes along the engagement direction D2 and the long first groove 54 with which the retaining portion 64 is engaged. Accordingly, as shown in FIG. 5, each engagement piece 60 is retained with a simple structure, and also, the efficiency of the operation of mounting the heat-shield cover 40 improves.

The fuel tank apparatus 15 shown in FIG. 1 is disposed between the head pipe 4 and the rider seat 18, and the bending portion 45 of the heat-shield cover 40 shown in FIG. 2 is positioned at the front end of the heat-shield cover 40. Accordingly, incoming wind A can smoothly flow rearward together with hot air from the engine E while the unbroken bending portion 45 reduces air resistance. As a result, an increase in the temperature of the fuel pump 28 can be further suppressed.

Although the heat-shield cover 40 is mounted on the coupling portion 35 between the fuel pump 28 and the fuel tank 26 in the above embodiment, the heat-shield cover 40 may be mounted on the fuel pump 28 or the fuel tank 26. As an example of such an alternative, a bowl-shaped heat-shield cover may be prepared and may be fitted to an outer peripheral surface of the pump flange 32. As another example, the heat-shield cover may be fastened to the pump flange 32 with bolts. Alternatively, the heat-shield cover may be fastened to the bottom plate 26b of the fuel tank 26 with bolts, as yet another example.

Even in these examples, as compared with the case where the heat-shield cover is mounted on the engine E, the heat-shield cover 40 can be downsized, and in addition, the fuel pump 28, which is to be protected, can be reliably covered, resulting in a high heat-shielding effect. Therefore, an increase in the temperature of the fuel pump 28 can be suppressed. Furthermore, since the heat-shield cover is not provided on the engine E, it is possible to prevent a component around the engine E and the heat-shield cover 40 from interfering with each other.

The present invention is not limited to the above embodiment, and various additions, changes, or deletions can be made without departing from the gist of the present invention. For example, although the heat-shield cover 40 covers the lower surface and the front of the pump flange 32 in the above embodiment, it is sufficient that the heat-shield cover 40 may cover at least the lower surface of the pump flange 32. The fuel tank apparatus according to the present invention is also applicable to engines of vehicles other than motorcycles and can also be applied to engines that are installed on the ground. Therefore, these are construed as included within the scope of the present invention.

What is claimed is:

1. A fuel tank apparatus, which is disposed above an engine comprising:
   a fuel tank;
   a fuel pump coupled to a bottom of the fuel tank; and
   a heat-shield cover mounted at a coupling portion between the fuel pump and the fuel tank, the heat-shield cover covering a portion of the fuel pump, the portion of the fuel pump being exposed from the fuel tank, to shield the portion of the fuel pump from heat of the engine, wherein
   the fuel pump includes: a pump main body; and a pump flange that is provided on a lower portion of the pump main body and coupled to the bottom of the fuel tank,
   the coupling portion surrounds the pump flange,
   the heat-shield cover covers at least a lower surface of the pump flange,
   the heat-shield cover is formed by bending a sheet-like member and includes:
   a cover portion that covers the lower surface of the pump flange; and
   a mounting portion that is bent to continue from the cover portion so as to be mounted on the pump flange.

2. The fuel tank apparatus as claimed in claim 1, wherein the cover portion has therein a through-hole through which a fuel supply pipe extending from the pump main body penetrates, and
   a wire for the fuel pump is led from a gap between the cover portion and the mounting portion.

3. The fuel tank apparatus as claimed in claim 1, wherein an engagement groove is formed at an end portion of the mounting portion that is on an opposite side of the sheet-like member from the cover portion, and
   an engagement piece that is engaged with the engagement groove is formed at an end portion of the cover portion that is on an opposite side of the sheet-like member from the mounting portion.

4. The fuel tank apparatus as claimed in claim 3, wherein the engagement piece includes:
   an engagement piece main body having a shape of a strip extending in an engagement direction; and
   a retaining portion projecting from the engagement piece main body in a widthwise direction of the strip, and
   the engagement groove includes:
   a short groove through which the engagement piece main body passes along the engagement direction; and
   a long groove with which the retaining portion is engaged.

5. The fuel tank apparatus as claimed in claim 1, wherein the fuel tank apparatus is disposed between a head pipe and a rider seat of a motorcycle, and
   a bending portion of the heat-shield cover that is between the cover portion and the mounting portion is positioned at a front end of the heat-shield cover.

* * * * *